United States Patent
Sharma et al.

(10) Patent No.: US 11,111,444 B2
(45) Date of Patent: Sep. 7, 2021

(54) PROCESS FOR REDUCING NITROGEN CONTENT OF HYDROCARBON FEED

(71) Applicant: RELIANCE INDUSTRIES LIMITED, Mumbai (IN)

(72) Inventors: Rajesh Vishnudev Sharma, Thane-Maharashtra (IN); Sanjeev Shriniwas Katti, Mumbai-Maharashtra (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 16/760,251

(22) PCT Filed: Oct. 30, 2018

(86) PCT No.: PCT/IB2018/058470
§ 371 (c)(1),
(2) Date: Apr. 29, 2020

(87) PCT Pub. No.: WO2019/087051
PCT Pub. Date: May 9, 2019

(65) Prior Publication Data
US 2020/0347307 A1 Nov. 5, 2020

(30) Foreign Application Priority Data
Oct. 31, 2017 (IN) .............................. 201721038726

(51) Int. Cl.
*C10G 25/00* (2006.01)
*B01J 20/08* (2006.01)

(52) U.S. Cl.
CPC ............ *C10G 25/003* (2013.01); *B01J 20/08* (2013.01); *C10G 2300/1055* (2013.01); *C10G 2300/202* (2013.01)

(58) Field of Classification Search
CPC .......... C10G 25/003; C10G 2300/1055; C10G 2300/202; C10G 25/00; B01J 20/08
See application file for complete search history.

(56) References Cited

U.S. PATENT DOCUMENTS

| 7,473,351 | B2 | 1/2009 | Burnett et al. | |
|---|---|---|---|---|
| 2009/0321309 | A1* | 12/2009 | Koseoglu | C10G 53/08 208/39 |
| 2016/0167015 | A1* | 6/2016 | Podsiadlo | B01D 53/047 208/290 |
| 2017/0057839 | A1* | 3/2017 | Atieh | B01J 20/08 |

OTHER PUBLICATIONS

Shakirullah, Desulfurization Study of Petroleum Products through Extraction with Aqueous Ionic Liquids, Jun. 2010, Journal of the Chilean Chemical Society, v 55 n2. (Year: 2010).*
ISR for International Application PCT/IB2018/058470.
Written Opinion for International Application PCT/IB2018/058470.

\* cited by examiner

*Primary Examiner* — Prem C Singh
*Assistant Examiner* — Juan C Valencia
(74) *Attorney, Agent, or Firm* — Ladas & Parry LLP

(57) ABSTRACT

The present disclosure relates to a process for reducing the nitrogen content in a hydrocarbon feed comprising nitrogen compound. The process comprises mixing the hydrocarbon feed containing nitrogen compounds with at least one adsorbent and stirring at a temperature in the range of 25° C. to 80° C. for a pre-determined time period. The adsorbents of the present disclosure are efficient for the removal of refractory organic nitrogen compounds in the range of 0.01 ppm to 10 ppm. The process of the present disclosure is simple and use inexpensive adsorbent and requires mild operation conditions.

11 Claims, No Drawings

PROCESS FOR REDUCING NITROGEN CONTENT OF HYDROCARBON FEED

RELATED APPLICATION

This application is a national phase entry under 35 USC 371 of International Patent Application No. PCT/IB2018/058470 filed on 30 Oct. 2018, which claims priority from Indian Application No. 201721038726 filed on 31 Oct. 2017, the disclosures of which are incorporated in their entirety by reference herein.

FIELD

The present disclosure relates to a process for reducing the nitrogen content in a hydrocarbon feed comprising nitrogen compounds, particularly refractory organic nitrogen compounds.

DEFINITIONS

As used in the present disclosure, the following terms are generally intended to have the meaning as set forth below, except to the extent that the context in which they are used to indicate otherwise.

The term 'refractory organic nitrogen compounds' refers to nitrogen containing heterocyclic aromatic compounds that are resistant to reaction with hydrogen during hydrotreating processes such as hydrocracking and hydroprocessing.

BACKGROUND

The background information herein below relates to the present disclosure but is not necessarily prior art.

The nitrogen compounds present in automobile fuel get converted into nitrogen oxides (NOx) upon combustion. These oxides are harmful and are responsible for various adverse environmental and health issues. Environmental legislative agencies of various countries have imposed stringent regulations on the maximum allowable nitrogen compounds in the automobile fuel.

Conventional processes to reduce the nitrogen content in the automobile fuel involve hydrotreatment of the hydrocarbon feed from which the automobile fuel is produced. Hydrotreatment involves process step of reacting the hydrocarbon feed with hydrogen at high temperature and at high pressure. However, such processes remove limited amounts of the nitrogen compounds in the hydrocarbon feed. The hydrotreatment is costly and involves complex unit operation. The refractory organic nitrogen compounds, which comprise pyrrole, pyrrolidine, quinolone, indole, acridine and derivatives thereof, are difficult to remove.

There is, therefore, felt a need to develop a simple, economic and efficient process for reducing the nitrogen content in a hydrocarbon feed comprising nitrogen compounds.

OBJECTS

Some of the objects of the present disclosure, which at least one embodiment herein satisfies, are as follows.

It is an object of the present disclosure to ameliorate one or more problems of the prior art or to at least provide a useful alternative.

Another object of the present disclosure is to provide a simple, economic and efficient process for reducing the nitrogen in a hydrocarbon feed.

Other objects and advantages of the present disclosure will be more apparent from the following description, which is not intended to limit the scope of the present disclosure.

SUMMARY

The present disclosure relates to a process for reducing the nitrogen content in a hydrocarbon feed comprising nitrogen compounds. The process comprises the following steps:

The hydrocarbon feed is mixed with at least one adsorbent to obtain a mixture. The mixture is stirred at a temperature in the range of 25° C. to 80° C. for a pre-determined time period to obtain a resultant mixture. The resultant mixture is allowed to separate an upper phase comprising treated hydrocarbon having reduced nitrogen content and a lower phase comprising a complex of the nitrogen compounds and the adsorbent.

The upper phase is separated from the lower phase to obtain a treated hydrocarbon having reduced content of nitrogen compounds.

Typically, the nitrogen compounds comprise refractory organic nitrogen compounds selected from the group consisting of pyrrole, pyrrolidine, quinolone, indole, acridine and derivatives thereof. Typically, the hydrocarbon feed is diesel.

Typically, the mass of the adsorbent used is in the range of 0.25 mass % to 10 mass % of the mass of the hydrocarbon feed. Typically, the adsorbent is a mixture of a Lewis acid and a Lewis base.

The present disclosure provides a simple, easy to operate and inexpensive process for reducing the content of nitrogen compounds in a hydrocarbon feed.

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The nitrogen compounds present in automobile fuel get converted into nitrogen oxides (NOx) upon combustion. These oxides are harmful and are responsible for various adverse environmental and health issues. The conventional processes for removing nitrogen compounds are costly and involve complex unit operations.

The present disclosure therefore, discloses a simple and easy to operate process for reducing the content of nitrogen in a hydrocarbon feed comprising nitrogen compounds.

The process comprises the following steps:

The hydrocarbon feed comprising nitrogen compounds is mixed with at least one adsorbent to obtain a mixture.

The mixture is stirred at a temperature in the range of 25° C. to 80° C. for a pre-determined time period to obtain a resultant mixture. The resultant mixture is allowed to separate an upper phase comprising treated hydrocarbon having reduced nitrogen content and a lower phase comprising a complex of the nitrogen compounds and the adsorbent.

The upper phase is separated from the biphasic mixture to obtain a treated hydrocarbon having reduced content of nitrogen compounds.

In accordance with the embodiments of the present disclosure, the nitrogen compounds comprise refractory organic nitrogen compounds. In accordance with the exemplary embodiments of the present disclosure, the nitrogen compounds are selected from the group consisting of pyrrole, pyrrolidine, quinolone, indole, acridine and derivatives thereof.

In accordance with the embodiments of the present disclosure, the hydrocarbon feed is diesel.

In accordance with the embodiments of the present disclosure, the mass of the adsorbent used is in the range of 0.25 mass % to 10 mass % of the mass of the hydrocarbon feed.

In accordance with the exemplary embodiments of the present disclosure, the mass of the adsorbent used is in the range of 1 mass % to 2.5 mass % of the mass of the hydrocarbon feed.

In accordance with the embodiments of the present disclosure, the adsorbent is at least one selected from the group consisting of Lewis acids, Lewis bases, zeolites, metal organic frameworks, mixed metal oxides, activated carbon and imprinted polymers.

In accordance with the embodiments of the present disclosure, the adsorbent is a mixture of a Lewis acid and a Lewis base.

In accordance with the embodiments of the present disclosure, the Lewis acid is at least one selected from the group consisting of $AlCl_3$, $FeCl_3$, $ZnCl_2$, $GaCl_3$, $InCl_3$, $TiCl_4$, $SnCl_4$, $BiCl_3$ and $ZrCl_4$; and the Lewis base is at least one selected from the group consisting of $Al(OH)_3$, $Fe(OH)_3$ and $Zn(OH)_2$.

In accordance with the exemplary embodiment of the present disclosure, the adsorbent is a mixture of $AlCl_3$, and $Al(OH)_3$.

In accordance with the embodiments of the present disclosure, the ratio of the Lewis acid to the Lewis base is in the range of 1:1 to 5:1, preferably 2:1.

In accordance with the embodiments of the present disclosure, the pre-determined time period is in the range of 15 minutes to 120 minutes.

It is observed that the use of adsorbent of the present disclosure significantly reduces the content of nitrogen compounds of diesel within 30 minutes of the reaction time at ambient temperature and pressure without the use of hydrogen gas.

The adsorbents of the present disclosure are efficient for the removal of refractory organic nitrogen compounds. The adsorbent used in the process of the present disclosure interacts with the nitrogen compounds present in the hydrocarbon feed resulting in formation of a complex of nitrogen compounds with the adsorbent. The reason for high efficiency could be the high affinity of the adsorbents towards the lone pair of nitrogen electron and also $\pi$-electronic cloud of the aromatic nitrogen compounds.

In accordance with the embodiments of the present disclosure, the treated hydrocarbon contains nitrogen content in the range of 0.01 ppm to 10 ppm, and sulfur content in the range of 0.1 ppm to 10 ppm.

The process described in the present disclosure is simple. Further, the process has many advantages over the prior art such as use of mild operating conditions, and easy to control conditions. The adsorbents used are inexpensive and easily available. Therefore, the process of the present disclosure is economical.

The foregoing description of the embodiments has been provided for purposes of illustration and not intended to limit the scope of the present disclosure. Individual components of a particular embodiment am generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiments 1-6: Reduction of Content of Refractory Organic Nitrogen Compounds in a Test Hydrocarbon Feed Test hydrocarbon feeds 1-5 were prepared by solubilizing refractory organic nitrogen compounds, pyrrole, pyrrolidine, quinolone, indole, and acridine respectively, in iso-octane so as to obtain final nitrogen content of 75 ppm. A test feed 6 was prepared by mixing equal amounts of pyrrole, pyrrolidine, quinolone, indole, acridine in iso-octane so as to obtain a final nitrogen content of 75 ppm.

The adsorbent used in this experiment was a mixture of aluminium chloride and aluminium hydroxide in a mole ratio of 2:1.

The test hydrocarbon feed (100 g) was mixed with the adsorbent (1 mass %) to obtain a mixture. The mixture was stirred at 50° C. under atmospheric pressure for 30 minutes at 300 rpm to obtain a resultant mixture. The so obtained resultant mixture was allowed to settle to obtain an upper phase and a lower phase.

The upper phase comprising the treated test hydrocarbon was separated from the lower phase by decantation. The treated test hydrocarbon was analyzed for total nitrogen content using a total sulfur total nitrogen analyzer (TSTN analyzer). The results are summarized in Table-1.

TABLE 1

| Experiment no. | Test hydrocarbon feed | % mass of the nitrogen removed |
|---|---|---|
| 1 | 1 (iso-octane + pyrrole) | 99.76 |
| 2 | 2 (iso-octane + pyrrolidine) | 99.78 |
| 3 | 3 (iso-octane + quinoline) | 99.82 |
| 4 | 4 (iso-octane + indole) | 99.83 |
| 5 | 5 (iso-octane + acridine) | 99.88 |
| 6 | 6 (iso-octane + Mixture) | 99.91 |

It was observed that the nitrogen content was reduced by 99% using 1 mass % of the adsorbent.

Thus, the additive of the present disclosure is found to be effective in reducing the content of refractory organic nitrogen compounds in the test hydrocarbon feed.

Experiments 7-12: Reduction of Content of Refractory Organic Nitrogen Compounds in Commercial Diesel Samples Diesel (100 g) obtained from various diesel venders such as Bharat Petroleum Corporation Limited (BPCL), Indian Oil Corporation Limited (IOCL) and Hindustan Petroleum Corporation Limited (HPCL). The initial concentration of nitrogen compounds in diesel samples was measured by TSTN analyzer.

The initial nitrogen concentration of BPCL, IOCL and HPCL diesel was 1.015 ppm, 30.4 ppm and 0.96 ppm respectively.

100 g of the diesel sample was taken in 250 ml three neck round bottom flask. A predetermined amount of adsorbent (1 wt % and 2.5 wt %) was added to the diesel sample and the experiment was performed using conditions similar to that of experiment-1 except that the experiment was carried out at 35° C. The results are summarized in Table-2.

TABLE 2

| Experiment no. | Test hydrocarbon feed | Initial nitrogen concentration (ppm) | Final nitrogen concentration (ppm) | % mass of the nitrogen removed |
|---|---|---|---|---|
| 7 | BPCL | 1.015 | 0.12 | 88.18 |
| 8 | IOCL | 30.4 | 7.19 | 76.35 |
| 9 | HPCL | 0.96 | 0.08 | 91.67 |
| 10 | BPCL | 1.015 | 0.01 | 99.01 |
| 11 | IOCL | 30.4 | 0.12 | 99.61 |
| 12 | HPCL | 0.96 | 0.07 | 92.71 |

It was observed that the nitrogen content was reduced by at least 90% using 2.5 mass % of the adsorbent.

The content of refractory sulfur compounds was also analyzed in the above experiments. The results are summarized in Table-3.

TABLE 3

| Experiment no. | Test hydrocarbon feed | Initial sulfur concentration (ppm) | Final sulfur concentration (ppm) | % mass of sulfur content removed |
|---|---|---|---|---|
| 7 | BPCL | 22.5 | 9.1 | 59.56 |
| 8 | IOCL | 24.22 | 9.3 | 61.60 |
| 9 | HPCL | 26.1 | 9.86 | 62.22 |
| 10 | BPCL | 22.5 | 3.7 | 83.56 |
| 11 | IOCL | 24.22 | 4.5 | 81.42 |
| 12 | HPCL | 26.1 | 4.4 | 83.14 |

It was observed that the sulfur content was reduced by at least 80% using 2.5 mass % of the adsorbent.

Experiment 13-15: Selectivity for Nitrogen Compounds Over Sulfur Compounds

Test hydrocarbon feeds were prepared by 4,6-dimethyl-dibenzothiophene (4,6-DMDBT) and acridine in iso-octane so as to obtain final sulfur and nitrogen content of 75 ppm.

A mix feed was prepared by mixing equal amounts of 4,6-DMDBT and acridine in iso-octane so as to obtain a final sulfur and nitrogen content of 75 ppm each in the mixture.

The adsorbent used was a mixture of aluminium chloride and aluminium hydroxide in a mole ratio of 2:1.

The test hydrocarbon feed (100 g) was mixed with the adsorbent (I mass %) to obtain a mixture. The mixture was stirred at 50° C. under atmospheric pressure for 30 minutes at 300 rpm to obtain a resultant mixture. The so obtained resultant mixture was allowed to settle to obtain an upper phase and a lower phase.

The upper phase comprising the treated test hydrocarbon was separated from the lower phase by decantation. The treated test hydrocarbon was analyzed for total sulfur and nitrogen content using a total sulfur total nitrogen analyzer (TSTN analyzer). The results are summarized in Table-4.

TABLE 4

| Experiment no. | Test hydrocarbon feed | Initial nitrogen/sulfur concentration (ppm) | Final nitrogen/ concentration (ppm) | Final sulfur concentration (ppm) |
|---|---|---|---|---|
| 13 | 1 (iso-octane + acridine) | 54 | 0.01 | — |
| 14 | 2 (iso-octane + 4,6-DMDBT) | 53 | — | 30 |
| 15 | 3 (iso-octane + acridine + 4,6-DMDBT) | 53 | 0.01 | 40 |

It was observed from table 4 that the adsorbent of the present selectively reduces content of the nitrogen compounds as compared to sulphur compounds.

TECHNICAL ADVANCEMENTS

The present disclosure described herein above has several technical advantages including, but not limited to, the realization of a process for reducing the content of sulfur compounds in a hydrocarbon feed, that is simple, and economic; and that is efficient.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for reducing the nitrogen content in a hydrocarbon feed comprising nitrogen compounds, the process comprising the following steps:
   a. mixing the hydrocarbon feed with at least one adsorbent to obtain a mixture;
   b. stirring the mixture at a temperature in the range of 25° C. to 80° C. for a pre-determined time period to obtain a resultant mixture;
   c. allowing the resultant mixture to settle to separate an upper phase comprising treated hydrocarbon having reduced nitrogen content and a lower phase comprising a complex of nitrogen compounds and the adsorbent; and
   d. separating the upper phase from the lower phase to obtain treated hydrocarbon having reduced nitrogen content;

wherein the adsorbent is a mixture of a Lewis acid and a Lewis base;

wherein the Lewis acid is at least one selected from the group consisting of $AlCl_3$, $FeCl_3$, $ZnCl_2$, $GaCl_3$, $InCl_3$, $TiCl_4$, $SnCl_4$, $BiCl_3$ and $ZrCl_4$; and the Lewis base is at least one selected from the group consisting of $Al(OH)_3$, $Fe(OH)_3$ and $Zn(OH)_2$.

2. The process as claimed in claim 1, wherein the nitrogen compounds comprise refractory organic nitrogen compounds.

3. The process as claimed in claim 1, the nitrogen compounds are selected from the group consisting of pyrrole, pyrrolidine, quinolone, indole, acridine and derivatives thereof.

4. The process as claimed in claim 1, wherein the hydrocarbon feed is diesel.

5. The process as claimed in claim 1, wherein the mass of the adsorbent used is in the range of 0.25 mass % to 1.0 mass % of the mass of the hydrocarbon feed.

6. The process as claimed in claim 1, wherein the adsorbent is a mixture of $AlCl_3$, and $Al(OH)_3$.

7. The process as claimed in claim 1, wherein the mole ratio of the Lewis acid to the Lewis base is in the range of 1:1 to 5:1.

8. The process as claimed in claim 1, wherein the stirring in step (ii) is carried out at atmospheric pressure and at a stirring speed in the range of 100 rpm to 1000 rpm.

9. The process as claimed in claim 1, wherein the pre-determined time period is in the range of 15 minutes to 120 minutes.

10. The process as claimed in claim 1, wherein the treated hydrocarbon has nitrogen compounds in the range of 0.01 ppm to 10 ppm.

11. The process as claimed in claim 1, wherein the treated hydrocarbon has sulfur compounds in the range of 0.1 ppm to 10 ppm.

* * * * *